(12) United States Patent
Buchleitner

(10) Patent No.: US 9,121,494 B2
(45) Date of Patent: Sep. 1, 2015

(54) GEAR ARRANGEMENT

(75) Inventor: Helmut Buchleitner, Seewalchen (AT)

(73) Assignee: Miba Sinter Austria GmbH, Laakirchen (AT)

( * ) Notice: Subject to any disclaimer, the term of this patent is extended or adjusted under 35 U.S.C. 154(b) by 380 days.

(21) Appl. No.: 13/805,393

(22) PCT Filed: Jun. 22, 2011

(86) PCT No.: PCT/AT2011/000279
§ 371 (c)(1),
(2), (4) Date: Jan. 11, 2013

(87) PCT Pub. No.: WO2011/160153
PCT Pub. Date: Dec. 29, 2011

(65) Prior Publication Data
US 2013/0112027 A1    May 9, 2013

(30) Foreign Application Priority Data

Jun. 23, 2010  (AT) ................................ A 1047/2010

(51) Int. Cl.
*F16H 55/18* (2006.01)
(52) U.S. Cl.
CPC ........... *F16H 55/18* (2013.01); *Y10T 74/19898* (2015.01)
(58) Field of Classification Search
CPC ................ F15H 55/18; F16H 57/0006; Y10T 74/19898
See application file for complete search history.

(56) References Cited

U.S. PATENT DOCUMENTS

| 3,648,534 | A | * | 3/1972 | Fagarazzi | 74/440 |
| 3,916,713 | A | * | 11/1975 | Young | 74/411 |
| 4,273,995 | A | * | 6/1981 | Devanney | 235/139 R |
| 4,554,842 | A | * | 11/1985 | Wood, III | 74/409 |
| 4,640,147 | A | * | 2/1987 | Yasukawa et al. | 74/409 |
| 4,688,441 | A | * | 8/1987 | Yasukawa et al. | 74/409 |
| 4,696,201 | A | * | 9/1987 | Hattori et al. | 74/467 |
| 4,700,582 | A | * | 10/1987 | Bessette | 74/409 |

(Continued)

FOREIGN PATENT DOCUMENTS

| AT | 507 071 | 2/2010 |
| CN | 2634200 Y | 8/2004 |

(Continued)

OTHER PUBLICATIONS

International Search Report of PCT/AT2011/000279, date of mailing Jun. 22, 2011.

*Primary Examiner* — David M Fenstermacher
(74) *Attorney, Agent, or Firm* — Collard & Roe, P.C.

(57) ABSTRACT

The invention relates to a gear arrangement (1), comprising a main gear (2) and a gear (4) that can be rotated relative to the main gear in the circumferential direction (3), wherein the main gear (2) or the rotatable gear (4) has at least one supporting web (12) that protrudes in the axial direction (7) and the rotatable gear (4) or the main gear (2) has at least one opening (16), in which the supporting web (12) is at least partially accommodated, wherein the opening (16) has a dimension in the circumferential direction (3) that is greater than the dimension of the supporting web (12) in the same direction, and comprising at least one spring element (10), which acts in the circumferential direction (3) of the main gear (2) and which is arranged on a lateral surface (13) of the supporting web (12) or on a lateral surface (17) of the opening (16) and at least partially within the opening (16). The spring element (10) is connected to the supporting web (12) or the lateral surface (17) of the opening (16).

9 Claims, 4 Drawing Sheets

(56) References Cited

U.S. PATENT DOCUMENTS

| | | | |
|---|---|---|---|
| 4,739,670 A * | 4/1988 | Tomita et al. | 74/409 |
| 4,745,823 A * | 5/1988 | Morita et al. | 74/409 |
| 5,067,364 A * | 11/1991 | Janiszewski | 74/440 |
| 5,473,592 A * | 12/1995 | Choi | 720/664 |
| 5,791,190 A * | 8/1998 | Konno | 74/411 |
| 5,934,144 A * | 8/1999 | Marinkovic | 74/440 |
| 6,293,166 B1 * | 9/2001 | Genter et al. | 74/440 |
| 6,661,986 B2 * | 12/2003 | Kitayama | 399/167 |
| 6,997,079 B2 | 2/2006 | Nomura et al. | 74/440 |
| 8,621,951 B2 * | 1/2014 | Meier | 74/409 |
| 8,677,849 B2 * | 3/2014 | Simpson | 74/440 |
| 2008/0141811 A1 | 6/2008 | Sandner | |

FOREIGN PATENT DOCUMENTS

| | | |
|---|---|---|
| CN | 1730983 A | 2/2006 |
| CN | 201236937 Y | 5/2009 |
| DE | 100 58 482 | 6/2002 |
| GB | 560 469 | 4/1944 |
| GB | 2 409 014 | 6/2005 |
| JP | 58-008864 | 1/1983 |
| JP | 60-078159 | 5/1985 |
| JP | 08-159242 | 6/1996 |
| JP | 2001-012581 | 1/2001 |
| WO | WO 2005/090829 | 9/2005 |
| WO | WO 2005/090830 | 9/2005 |

* cited by examiner

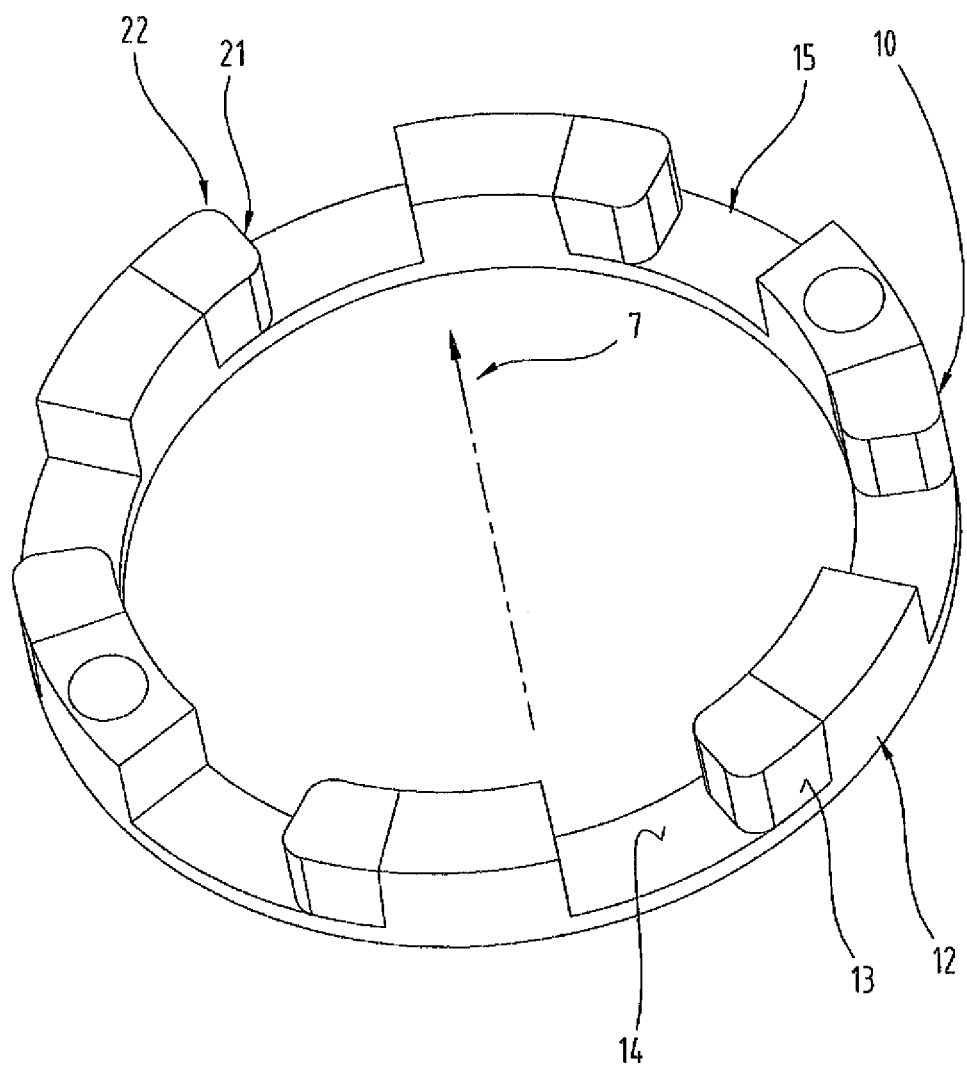

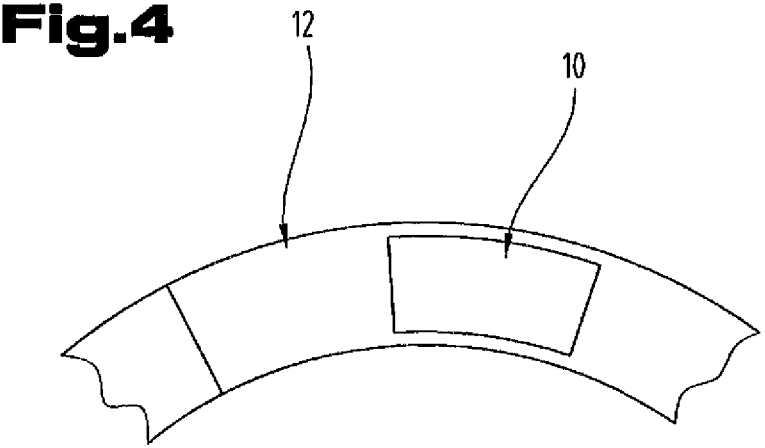
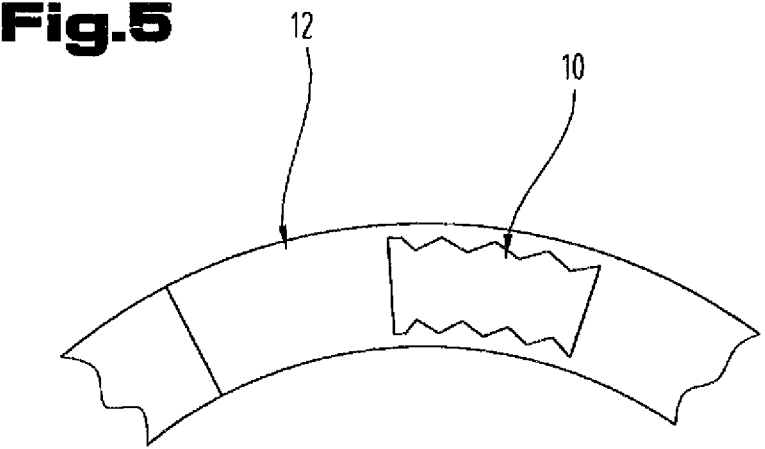

GEAR ARRANGEMENT

CROSS REFERENCE TO RELATED APPLICATIONS

This application is the National Stage of PCT/AT2011/000279 filed on Jun. 22, 2011, which claims priority under 35 U.S.C. §119 of Austrian Application No. A 1047/2010 filed on Jun. 23, 2010, the disclosure of which is incorporated by reference. The international application under PCT article 21(2) was not published in English.

The invention relates to a gear arrangement comprising a main gear and a gear that is rotatable relative to the latter in circumferential direction, wherein the main gear or the rotatable gear comprises at least one support web projecting in axial direction and the rotatable gear or the main gear comprises at least one recess, in which the support web is mounted at least partly, wherein the recess has a dimension in circumferential direction, which is greater than the dimension of the support web in the same direction, and with at least one spring element acting in the circumferential direction of the main gear which spring element is arranged on a lateral surface of the support web or on a lateral surface of the recess and at least partly inside the recess.

Such a gear arrangement is known for example from WO 2005/090830 A1 of the same applicant which comprises a gear for a playfree spur gear stage with a hub, with a sprocket supported by the hub which sprocket is divided along an axially normal dividing plane into two part rims, namely into a hub-fixed rim part and a rim ring mounted to be rotatable coaxially relative to the latter, and with an annular spring surrounding the hub, which is supported by its ends opposite one another in circumferential direction on support webs formed with the two part rims, overlapping one another in axial direction which are arranged in circumferential direction to the sprocket. The support web of a part rim passes through the other part rim in a through opening with play in circumferential direction and the support web of the part rim with the through opening forms an assembly stop delimiting the through opening for the other support web. The rim ring is secured axially onto the hub for example by means of a snap ring.

From WO 2005/090829 A1, also of the same applicant, a gear is known for a play-free spur gear stage comprising a hub, with a sprocket supported by the hub, which sprocket is divided along an axially normal dividing plane into two part rims, namely into a hub-fixed rim part and a rim ring mounted coaxially rotatably relative to the latter, and comprising a spring arrangement acting in the circumferential direction of the sprocket consisting of spring elements distributed rotationally symmetrically around the circumference, which are supported respectively on both part rims, wherein the spring elements consisting of elastomeric spring bodies are provided on a ring surrounding the hub and engage with the support stops of the rim ring.

JP 08-159242 A describes a play-free spur gear stage consisting of a first gear made of metal and a second gear made of an elastically moldable plastic.

The objective of the present invention is to simplify a gear arrangement of this kind.

Said objective is achieved by means of the aforementioned gear arrangement, in which the spring element is connected to the support web or the lateral surface of the recess.

The advantage here is that by connecting the spring element to the support web or the lateral surface of the recess no additional installation space has to be provided for the arrangement of the spring element between the two gears, which means that the gear arrangement can be made smaller in axial direction. In addition, the additional covering of the recess in axial direction is not necessary in this case. Thus overall the number of components in the gear arrangement can be reduced, which means that the production of said gear arrangement is simplified.

According to a preferred embodiment the spring element is made at least partly from at least one elastomer. It is thus possible to use a relatively small spring element, which means that the structural size of the gear arrangement can be reduced further without decreasing its functionality.

Preferably, a thermoplastic elastomer is used, in particular selected from a group comprising TPU, TPA and TPE, as the known advantages of the thermoplastic workability of elastomers simplify the production of the gear arrangement significantly.

In the preferred embodiment of the gear arrangement the spring element is vulcanized onto the support web or the lateral surface of the recess, so that no further manual manipulation is necessary for connecting the spring element to the gear. Furthermore, improved precision of the form of the spring element can be achieved by adjusting to the surface of the gear and better adhesion of the spring element to the surface of the gear can be achieved.

However, it is also possible, even if this increases the effort of assembling the gear arrangement, for the spring element to be adhered onto the support web or the lateral surface of the recess in order to achieve a separate production of the spring element. In particular, this is an advantage when replacing the spring element, or if the spring element has a more complex structure consisting of several individual layers, by means of which better adjustment to the desired spring behavior of the spring element can be achieved.

The spring element can be configured at least partly to have rounded edges and/or corners, whereby on the one hand the spring element can be demolded more easily, particularly if the latter is vulcanized onto the gear, and on the other hand the function of the spring element in the gear arrangement can also be improved, in particular the lifetime of the spring element can be improved with less wear owing to reduced signs of frictional wear.

To extend the lifetime and improve the wearing properties of the spring element it is also possible to apply an antifrictional coating to the surface of the spring element or to incorporate a solid lubricant in the spring element.

The wearing properties of the spring element are also improved if the latter is reinforced by fibers, and it is an advantage that with fiber reinforcement the elastic properties of the spring element can be largely retained.

To improve or adjust the spring elasticity of the spring element it is also possible for the latter to have a conical or trapezoidal or accordion-like or convex cross section.

Instead of being made from an elastomer the spring element can also be made at least partly from a polymer comprising recesses, in particular pores, and by means of the recesses compressibility is achieved within certain limits, so that the polymer can also be a so-called hard plastic and in this way said spring element has a correlative lifetime. Moreover, recesses of this kind can also be provided in a spring element made from an elastomer.

For a better understanding of the invention the latter is explained in more detail with reference to the following Figures.

In a schematically simplified view:

FIG. 3 shows a part of the rotatable gear of the gear set in oblique view;

FIG. 4 shows an embodiment variant of a spring element in plan view;

FIG. 5 shows a further embodiment variant of a spring element in plan view.

Figure 1:
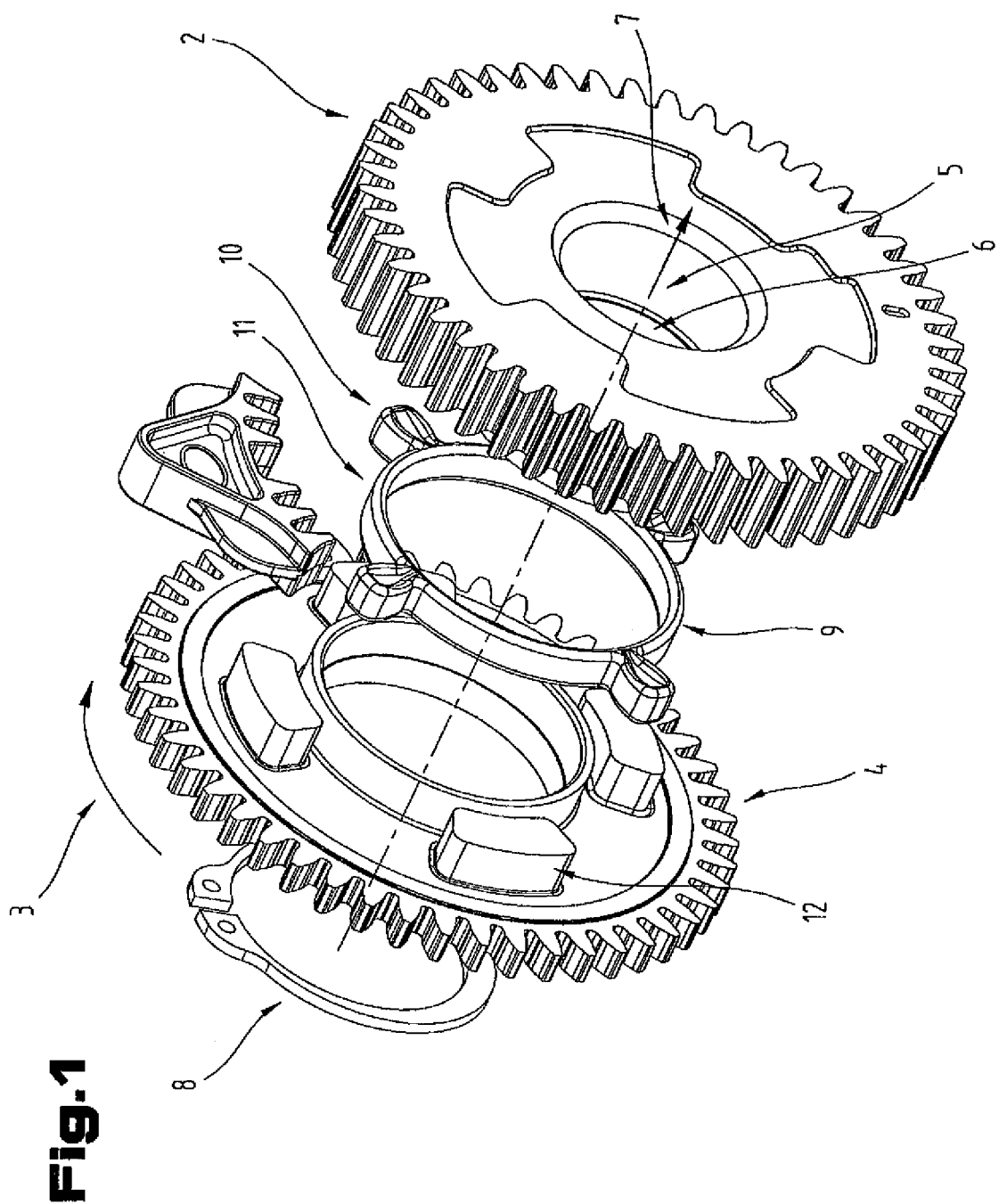
FIG. 1 shows a gear set according to the prior art in an exploded view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

FIG. 1 shows in exploded view a gear arrangement 1, as known from WO 2005/090829 A1. Said gear arrangement 1, also known as a "split-gear", comprises a main gear 2 and a gear 4 rotatable relative to the latter in circumferential direction 3, wherein the main gear 2 comprises a hub 5 which is formed in particular in one piece with the main gear 2. The rotatable gear 4 is arranged rotatably on the hub 5 of the main gear 2. The hub 5 comprises a recess 6 in the form of a bore for mounting a not shown threaded bolt with a screw head. In order to fix the position of the rotatable gear 4 in axial direction 8 on the main gear 2, a securing element 8 is provided, which in this embodiment variant is in the form of a snap ring. The securing element 8 engages in a surrounding groove formed in an end section of the hub 5.

Between the main gear 2 and the rotatable gear 4 a spring arrangement 9 acting in the circumferential direction 3 of the rotatable gear 4 is arranged, which comprises spring elements 10 distributed rotationally symmetrically around the circumference, said spring element being supported on the main gear 2 and the rotatable gear 4, wherein the spring elements 10 consisting of elastomeric spring bodies are provided on a ring 11 surrounding the hub 5 and engage with support webs 12, which are arranged projecting in axial direction on the rotatable gear 4.

Figure 2:
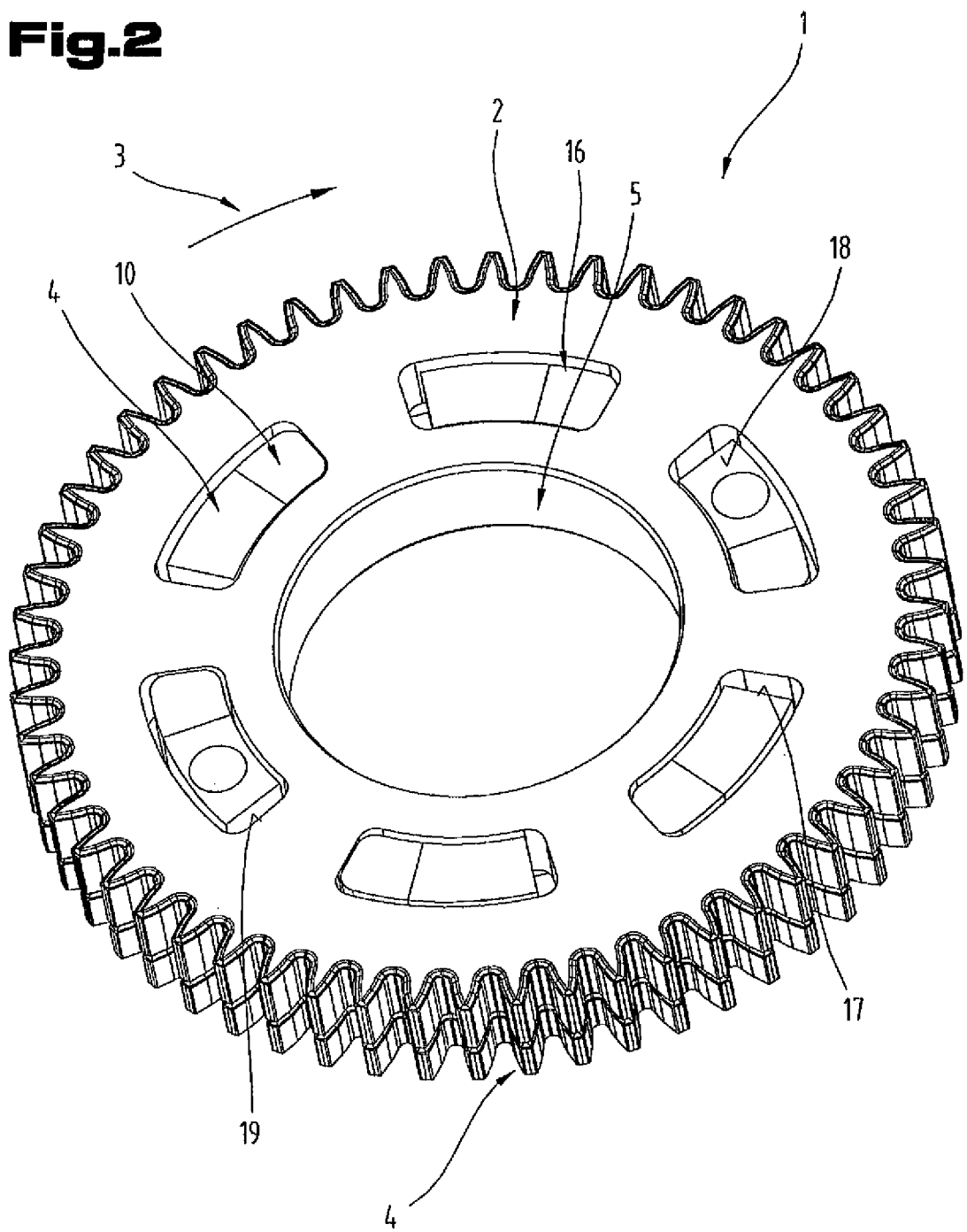
FIG. 2 shows a gear set according to the invention in oblique view.

FIGS. 2 and 3 show a first embodiment variant of the gear arrangement 1 according to the invention. Unlike the embodiment of the prior art described above in the configuration according to the invention the spring element 10 or spring elements 10 is/are no longer a separate part but are an integral component of the rotatable gear 4. In other words the spring element 10 is connected with the rotatable gear 4 to form one component.

FIG. 2 shows the main gear 2 and the rotatable gear 4 fitting thereon, which is pretensioned by the spring element 10 against the main gear 2 in circumferential direction 3. The rotatable gear 4 is arranged on the hub 5, which is only a short annular web—compared to the embodiment in FIG. 1, whereby the advantage of the reduced structural size of the gear set 1 according to the invention resulting from the arrangement of the spring elements 10 is substantiated.

FIG. 3 shows the arrangement of the spring elements 10 on the support webs 12.

Although it is possible in principle for only one spring element 10 to be attached to the gear arrangement 1, the preferred embodiment of the invention comprises a plurality of spring elements 10, which are distributed in particular symmetrically in circumferential direction 3 on the rotatable gear 4, as shown in the representation of the invention in FIGS. 2 and 3. Whenever a plurality of spring elements 10 is mentioned in the following said embodiments also apply to embodiments of the gear arrangement with only one spring element 10.

The spring elements 10 are arranged on a lateral surface 13 of the support webs 12 pointing in circumferential direction 3 and connected therewith. In addition, the spring elements 10 can be joined at least partly also to a surface 14 of a ring element 15 of the rotatable gear 4 pointing in axial direction 7, on which and by means of which the support webs 12 are arranged in a projecting manner, however, this is not the preferred embodiment of the invention.

To connect the spring elements 10 to the respective support webs 12 the spring elements 10 are preferably vulcanized on. For this the unvulcanized or prevulcanized raw material for the respective spring element 10 is filled into a mold, in which the rotatable gear 4 is already placed, and which has suitable cavities for the formation of the spring elements 10, where one of the lateral surfaces of a cavity is formed by the lateral surface 13 of the respective support web 12 and the bottom surface is formed by the surface 14 of the ring element 15 of the rotatable gear 4 and vulcanized therein at a raised temperature adjusted to the respectively used raw material. If necessary to increase adhesive strength of the spring element 10 to the support web 12 its lateral surface 13 can be pretreated with a primer. It is also possible for the same reason to roughen the lateral surface 13. This also relates to the surface 14 of the ring element 15 of the rotatable gear 4. However, if the adhesion of the spring element 10 to the ring element 15 is not desirable, its surface 14 can be coated with a releasing agent or an anti-adhesive paper can be provided.

Preferably, the rotatable gear 4 and the main gear 2 are produced using a powder-metallurgy method and metallically, so that if necessary a surface roughness or surface structuring of the lateral surface 13 can be provided by the mold in which the powder is pressed to produce the rotatable gear 4. The surface structuring can also be in the form of grooves or recesses, in particular with undercuts, whereby a further improvement of the adhesion of the spring elements 10 to the respective support web 12 can be achieved.

To form the connection between the respective support web 12 and the respective spring element 10 it is also possible for the spring element 10 to be injected onto the lateral surface 13 of the support web 12. Since in the preferred embodiment the spring elements 10 are made at least partly, preferably completely, from at least one elastomer, it has proved to be an advantage if the elastomer is a thermoplastic elastomer. For this procedure it is also possible to use a corresponding mold, as described above.

An elastomer can be used for example selected from a group comprising natural rubber, styrene-butadiene-rubber, ethylene-propylene-diene-rubber, butadiene rubber, nitrile rubber, chloroprene-rubber, chlorosulfonated polyethylene and polyurethanes, silicones and blends or mixtures thereof. In particular, these materials were the most effective during the testing of the gear arrangement, even for spring elements 10 covering a relatively small area.

If a thermoplastic elastomer is used the latter is preferably selected from a group comprising TPU, TPA and TPE.

As explained in the following the spring elements 10 can also be made at least partly of a thermoplastic and/or thermoset, e.g. polyethylene, polypropylene, an ethylene vinyl acetate copolymer, a polyamide, polyvinyl chloride, polyethylene terephthalate or polyurethane.

However, in general mixtures of the said polymers can also be used for the spring elements 10.

A further way of connecting the spring elements 10 to the rotatable gear 4 is to adhere the latter, for which a suitable, commercially available adhesive can be used, if necessary in combination with a primer.

Furthermore, it is possible to provide a pure form fit between the spring elements 10 and the support webs 12 and/or the ring element 15 by means of a corresponding surface structure, as described above by way of example.

Furthermore, combinations of at least two of the said connecting possibilities can be used. However, in the preferred embodiment variant of the invention the spring elements 10 are vulcanized on.

As shown in FIG. 2, the main gear comprises recesses 16, into which the support webs 12 project in axial direction. Said recesses 16 have larger dimensions at least in circumferential direction 3 than the corresponding dimensions of the support webs 12, so that the spring elements 10 are also mounted in said recesses 16 and fit against a lateral surface 17 of the recesses 16. Between a further lateral surface 18 of the support webs 12 opposite the lateral surface 13 of the support webs 12 in circumferential direction and a further lateral surface 19 of the recesses 16 situated adjacent thereto a spacer element can be arranged (respectively), by means of which the rotatable gear 4 is pretensioned against the main gear 2 in circumferential direction.

According to one embodiment variant of the invention it is possible for the spring elements 10 not to be connected to the support webs 12 of the rotatable gear 4, but for the spring elements 10 to be connected to the lateral surfaces 17 of the recesses 16, where the above explanations relating to the connecting methods can also be applied accordingly in this embodiment variant for producing the connection of the spring elements 10 with the lateral surfaces 17.

According to a further embodiment variant in order to adjust the desired elasticity it is possible for the spring elements 10 to consist of several layers, at least two, where different materials can be used for the individual layers. The layers can be joined together by vulcanization, injection, adhesion, form fitting, etc. as explained above. It is also possible for metallic materials to be used for or in individual layers. For the remaining layers the aforementioned polymers can be used. Furthermore, it is possible for said layers to be different sizes, where the layer thickness and/or the cross-sectional area of the layers can vary in circumferential direction 3, i.e. the layering of spring elements 10 consisting of several layers.

In the preferred embodiment of the invention the spring elements 10 are made completely from an elastomer and are configured as a single layer.

It is also possible for the spring elements 10 or at least individual layers of the spring elements 10 to be provided with a solid lubricant, e.g. graphite or molybdenum disulfide and/or an antifrictional coating, e.g. made of PTFE.

To increase the mechanical stability of the spring element 10 it is also possible that the latter or at least individual layers of the spring elements 10 are reinforced by fibers, e.g. with glass fibers or mineral fibers or plastic fibers. The fibers can be premixed with the raw material for producing the polymer parts of the spring elements 10.

As shown in particular in FIG. 3, at least individual edges 21 and/or corners 22 of the spring elements 10 can be rounded, but preferably this does not apply to the edges 21 and corners 22 in the connecting area with the support webs 12 or the lateral surfaces 17 of the recesses 16.

FIGS. 4 and 5 show embodiment variants of the spring elements 10, the latter being connected to the support webs 12 but can also be connected to the main gear 2 (FIG. 2), as described above. In particular, said embodiment variants relate to different cross sectional forms of the spring elements 10. Thus FIG. 4 shows that the spring elements 10 can have a conical or trapezoidal cross section in circumferential direction 3 and FIG. 5 shows that they can have an accordion-like cross section in circumferential direction 3. In the latter embodiment variant multi-layered spring elements 10 can also be provided advantageously. However, the spring elements 10 may also have a different cross-sectional form, for example a convex shape.

According to another embodiment variant the spring elements 10 can be made at least partly of a polymer comprising recesses, in particular pores, particularly the aforementioned thermoplastics or thermosetting plastics, where a certain amount of elasticity or flexibility of the spring element 10 can be provided by means of the recesses or pores and the latter can also be adapted by means of the size of said recesses or pores.

Finally, for the sake of completion it should also be pointed out that the main gear 2 and/or the rotatable gear 4 are preferably made from sintered steel.

The ring element 15 can be produced as a separate component and connected to the rotatable gear 4, it is also possible for the latter to be configured in one piece with the rotatable gear 4.

The exemplary embodiments show possible embodiment variants of the gear arrangement 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Finally, as a point of formality, it should be noted that for a better understanding of the structure of the gear arrangement 1 the latter and its components have not been represented true to scale in part and/or have been enlarged and/or reduced in size.

The individual embodiments shown in FIGS. 2, 3; 4; 5 can form the subject matter of independent solutions according to the invention.

LIST OF REFERENCE NUMERALS

1 Gear arrangement
2 Main gear
3 Circumferential direction
4 Gear
5 Hub
6 Recess
7 Direction
8 Securing element
9 Spring arrangement
10 Spring element
11 Ring
12 Support web
13 Lateral surface
14 Surface
15 Ring element
16 Recess
17 Lateral surface
18 Lateral surface
19 Lateral surface
20
21 Edge
22 Corner

The invention claimed is:

1. A split-gear for backlash elimination in a spur gear stage comprising a main gear and a rotatable gear that is rotatable relative thereto in circumferential direction, the rotatable gear comprising at least one support web projecting in axial direction, which has two lateral surfaces extending in circumferential direction and a first end surface and a second end surface extending in radial direction and the main gear comprising at least one recess, in which the at least one support web is mounted at least partly, the at least one recess having a dimension in circumferential direction that is greater than the dimension of the at least one support web in the same direction, and with at least one spring element acting in the circumferential direction of the main gear, which is arranged on the first end surface of the at least one support web and at least partly inside the at least one recess, wherein the at least one spring element is made at least partly from at least one elastomer, is connected to the first end surface of the at least one support web and forms an integral component of the rotatable gear the two lateral surfaces and the second end surface of the at least one support web being free of the at least one spring element.

2. The split-gear as claimed in claim 1, wherein the at least one elastomer is a thermoplastic elastomer.

3. The split-gear as claimed in claim 1, wherein the at least one spring element is vulcanized onto the at least one support web.

4. The split-gear as claimed in claim 1, wherein the at least one spring element is adhered onto the at least one support web.

5. The split-gear as claimed in claim 1, wherein the at least one spring element is configured at least partly to have at least one of rounded edges and corners.

6. The split-gear as claimed in claim 1, wherein an antifrictional coating is applied to the surface of the at least one spring element.

7. The split-gear as claimed in claim 1, wherein the at least one spring element is reinforced by fibers.

8. The split-gear as claimed in claim 1, wherein the at least one spring element has a cross section which is selected from the group consisting of a conical cross section, a trapezoidal cross section, an accordion-like cross section, and a convex cross section in circumferential direction.

9. The split-gear as claimed in claim 1, wherein the at least one spring element comprises a layer provided with a solid lubricant.

* * * * *